(12) United States Patent
Akiyama et al.

(10) Patent No.: US 8,714,747 B2
(45) Date of Patent: May 6, 2014

(54) PROJECTOR HAVING A FIRST LIGHT SEPARATION OPTICAL SYSTEM AND A SECOND LIGHT SEPARATION OPTICAL SYSTEM

(75) Inventors: Koichi Akiyama, Matsumoto (JP);
Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 13/553,250

(22) Filed: Jul. 19, 2012

(65) Prior Publication Data

US 2013/0027670 A1    Jan. 31, 2013

(30) Foreign Application Priority Data

Jul. 27, 2011  (JP) ................................ 2011-164313
Feb. 16, 2012  (JP) ................................ 2012-031850

(51) Int. Cl.
*G03B 21/00* (2006.01)

(52) U.S. Cl.
USPC .................. 353/31; 353/30; 353/38; 353/94; 353/98; 353/99; 359/487.05; 359/489.07

(58) Field of Classification Search
USPC ................. 353/30, 31, 34, 37, 38, 94, 98, 99; 359/483.01, 485.06, 487.04, 487.05, 359/489.07, 489.1, 900; 348/743–747, 758, 348/794; 349/5, 7–9
See application file for complete search history.

(56) References Cited

U.S. PATENT DOCUMENTS

| 5,161,042 | A | 11/1992 | Hamada |
| 6,264,332 | B1 | 7/2001 | Honguh et al. |
| 7,364,305 | B2 | 4/2008 | Itoh |
| 7,815,314 | B2 * | 10/2010 | Kanayama et al. ............. 353/31 |
| 2002/0126390 | A1 | 9/2002 | Matsushita et al. |
| 2005/0012904 | A1 * | 1/2005 | Kim et al. ........................ 353/31 |
| 2008/0309885 | A1 * | 12/2008 | Ikeda et al. ..................... 353/31 |

FOREIGN PATENT DOCUMENTS

| JP | A-4-60538 | 2/1992 |
| JP | A-8-304739 | 11/1996 |
| JP | A-9-15626 | 1/1997 |
| JP | A-11-273441 | 10/1999 |
| JP | A-2002-214405 | 7/2002 |
| JP | A-2005-321502 | 11/2005 |
| JP | A-2005-352392 | 12/2005 |
| JP | A-2006-3636 | 1/2006 |
| JP | A-2009-63892 | 3/2009 |

* cited by examiner

*Primary Examiner* — Sultan Chowdhury
(74) *Attorney, Agent, or Firm* — Oliff PLC

(57) ABSTRACT

A projector includes a light source, a first light separation optical system adapted to separate light emitted from the light source into first light and second light, a second light separation optical system adapted to separate the first light into third light and fourth light, separate the second light into fifth light and sixth light, and emit the third light, the fourth light, the fifth light, and the six light in directions intersecting with a plane including a light axis of the light emitted from the light source and a light axis of the first light, and a light modulation element which the third light, the fourth light, the fifth light, and the sixth light enter.

12 Claims, 11 Drawing Sheets

PROJECTOR HAVING A FIRST LIGHT SEPARATION OPTICAL SYSTEM AND A SECOND LIGHT SEPARATION OPTICAL SYSTEM

BACKGROUND

1. Technical Field

The present invention relates to a projector.

2. Related Art

As a single-panel projector for performing color display by spatially separating the light emitted from a light source into a plurality of colored lights and then making the colored lights thus separated into respectively enter the corresponding sub-pixels, there is known a projector described in JP-A-4-60538 (Document 1). In the projector of Document 1, a red-light reflecting dichroic mirror, a green-light reflecting dichroic mirror, and a blue-light reflecting dichroic mirror are disposed along the incident light axis of the light emitted from the light source in a state nonparallel to each other. Thus, the light emitted from the light source is separated into red light, green light, and blue light having respective proceeding directions slightly different from each other on the same plane. The red light, the green light, and the blue light thus separated into are respectively collected by the microlens disposed on the entrance side of the light modulation element, and then respectively enter red sub-pixels, green sub-pixels, and blue sub-pixels of the light modulation element in the state spatially separated.

In the projector of Document 1, since the red-light reflecting dichroic mirror, the green-light reflecting dichroic mirror, and the blue-light reflecting dichroic mirror are disposed side by side along the incident light axis of the light, the red light, the green light, and the blue light are separated in one direction, namely one-dimensionally. In this case, the red sub-pixel, the green sub-pixel, and the blue sub-pixel are disposed side by side in one direction, namely one-dimensionally. Therefore, if the red sub-pixel, the green sub-pixel, and the blue sub-pixel are each formed to have a square shape, the aspect ratio of one pixel composed of the red sub-pixel, the green sub-pixel, and the blue sub-pixel is 3:1, and thus, the resolution of the image in the direction in which the red sub-pixel, the green sub-pixel, and the blue sub-pixel are arranged is degraded.

SUMMARY

An advantage of some aspects of the invention is to provide a projector in which the resolution of the image is difficult to be degraded.

An aspect of the invention is directed to a projector including a light source, a first light separation optical system adapted to separate light emitted from the light source into first light and second light, a second light separation optical system adapted to separate the first light into third light of a first color and fourth light of a second color, separate the second light into fifth light of a third color and sixth light of a fourth color, and emit the third light, the fourth light, the fifth light, and the six light in directions intersecting with a plane including a light axis of the light emitted from the light source and a light axis of the first light, and a light modulation element which the third light, the fourth light, the fifth light, and the sixth light enter.

According to this configuration, the light emitted from the light source can be separated in two directions, namely two-dimensionally, using the first light separation optical system and the second light separation optical system. Therefore, in the pixel provided to the light modulation element, the sub-pixel which the third light should enter, the sub-pixel which the fourth light should enter, the sub-pixel which the fifth light should enter, and the sub-pixel which the sixth light should enter can be arranged two-dimensionally. Therefore, the projector with which the resolution of the image is difficult to be degraded can be provided.

The projector may be configured such that the first light separation optical system includes a first reflecting element adapted to reflect the first light and transmit the second light, and a second reflecting element adapted to reflect the second light, and the second light separation optical system includes a third reflecting element adapted to reflect the third light and the fifth light and transmit the fourth light and the sixth light, and a fourth reflecting element adapted to reflect the fourth light and the sixth light.

According to this configuration, the light emitted from the light source can be separated into the third light, the fourth light, the fifth light, and the sixth light with a simple configuration.

The projector may be configured such that a reflecting surface of the first reflecting element is tilted with respect to a reflecting surface of the second reflecting element, and a reflecting surface of the third reflecting element is tilted with respect to a reflecting surface of the fourth reflecting element.

According to this configuration, the light emitted from the light source can be separated into the third light, the fourth light, the fifth light, and the sixth light with a simple configuration.

The projector may be configured such that, defining an imaginary axis forming an angle of 45° with the light axis of the light entering the first light separation optical system as a first axis, and an imaginary axis forming an angle of 45° with an imaginary axis perpendicular to both of the light axis of the light entering the first light separation optical system and the first axis as a second axis, an angle formed between the reflecting surface of the first reflecting element and the first axis and an angle formed between the reflecting surface of the second reflecting element and the first axis are equal to each other, and an angle formed between the reflecting surface of the third reflecting element and the second axis and an angle formed between the reflecting surface of the fourth reflecting element and the second axis are equal to each other.

According to this configuration, it is possible to make the third light, the fourth light, the fifth light, and the sixth light enter the light modulation element from four directions, respectively, at angles equal to each other.

The projector may be configured such that a pixel provided to the light modulation element includes a first sub-pixel corresponding to the third light, a second sub-pixel corresponding to the fourth light, a third sub-pixel corresponding to the fifth light, and a fourth sub-pixel corresponding to the sixth light, a microlens is disposed on a light entrance side of the light modulation element so as to correspond to the pixel, and the microlens collects a part of the third light toward the first sub-pixel, a part of the fourth light toward the second sub-pixel, a part of the fifth light toward the third sub-pixel, and a part of the sixth light toward the fourth sub-pixel.

According to this configuration, the four sub-pixels are arranged two-dimensionally in an area opposed to one microlens. Therefore, it is possible to make a part of the third light enter the first sub-pixel, a part of the fourth light enter the second sub-pixel, a part of the fifth light enter the third sub-pixel, and a part of the sixth light enter the fourth sub-pixel. Therefore, it becomes easy to manufacture the microlens.

The projector may be configured such that a shape of the first sub-pixel is a shape necessary and sufficient for being capable of including the light collected by the microlens toward the first sub-pixel, a shape of the second sub-pixel is a shape necessary and sufficient for being capable of including the light collected by the microlens toward the second sub-pixel, a shape of the third sub-pixel is a shape necessary and sufficient for being capable of including the light collected by the microlens toward the third sub-pixel, and a shape of the fourth sub-pixel is a shape necessary and sufficient for being capable of including the light collected by the microlens toward the fourth sub-pixel.

According to this configuration, by matching the collected images of the microlens and the respective shapes of the sub-pixels, it is possible to achieve improvement in light efficiency and downsizing of the light modulation element.

The projector may be configured such that the shapes of the first sub-pixel, the second sub-pixel, the third sub-pixel, and the fourth sub-pixel are each a roughly square shape.

According to this configuration, the shape of each pixel composed of the first sub-pixel, the second sub-pixel, the third sub-pixel, and the fourth sub-pixel becomes a roughly square shape. Therefore, the degradation of image resolution is difficult to occur.

The projector may be configured such that the microlens is an aspherical lens.

According to this configuration, it becomes easy to make a part of the third light enter the first sub-pixel, a part of the fourth light enter the second sub-pixel, a part of the fifth light enter the third sub-pixel, and a part of the sixth light enter the fourth sub-pixel.

The projector may be configured such that a low-refractive index layer, which has a refractive index at least 0.4 lower than a refractive index of the microlens in a visible wavelength band, is disposed on an lens surface side of the microlens.

According to this configuration, it is not required to increase the refractive force of the microlens. Therefore, not only the aspherical lens but also the spherical lens can be used as the microlens. Thus, it becomes easy to manufacture the microlens.

The projector may be configured such that the low-refractive index layer is one of a gas layer and a vacuum layer.

According to the configuration, the refractive index of the low-refractive index layer can be set to approximately 1. Thus, the difference in refractive index from the microlens can be maximized, and it becomes easy to manufacture the microlens. It should be noted that as the gas forming the gas layer, various gases such as air, nitrogen, or argon can be used, and air is preferable from an economic point of view. The vacuum forming the vacuum layer is only required to be a reduced-pressure state lower than the atmospheric pressure (1 atm), and is not necessarily required to be the perfect vacuum with zero pressure.

The projector may be configured such that the microlens is a spherical lens.

According to this configuration, it becomes easy to manufacture the microlens. Further, it becomes also easy to reduce the aberration of the microlens.

The projector may be configured such that each of the third light, the fourth light, the fifth light, and the sixth light is colored light selected from the group consisting of blue light, green light, yellow light and red light.

According to this configuration, it becomes possible to perform image display with high color reproducibility using the blue light, the green light, the yellow light, and the red light.

The projector may be configured such that the third light is one of the green light and the yellow light.

The third light, the fourth light, the fifth light, and the sixth light are different from each other in the light path length to the light modulation element. If the light path length to the light modulation element increases, the light enters the light modulation element in the state of being widely spread, and therefore, the light intensity of the light entering the display area of the light modulation element is lowered to thereby cause dark display. The third light is reflected by the first reflecting element and the third reflecting element, and therefore the light path length thereof to the light modulation element is the shortest. Therefore, the spread of the light is the narrowest, and bright display can be obtained. Therefore, by setting the third light to the green light or the yellow light with the higher human luminosity factor, image display with preferable visibility can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
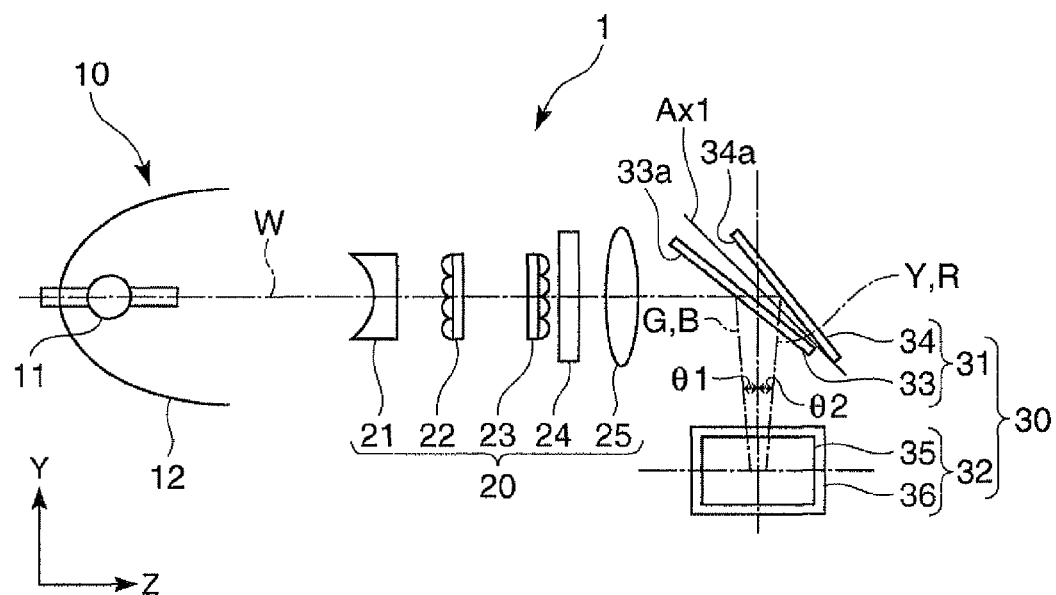
FIGS. 1A and 1B are schematic diagrams of a projector according to a first embodiment of the invention.
Figure 1B:
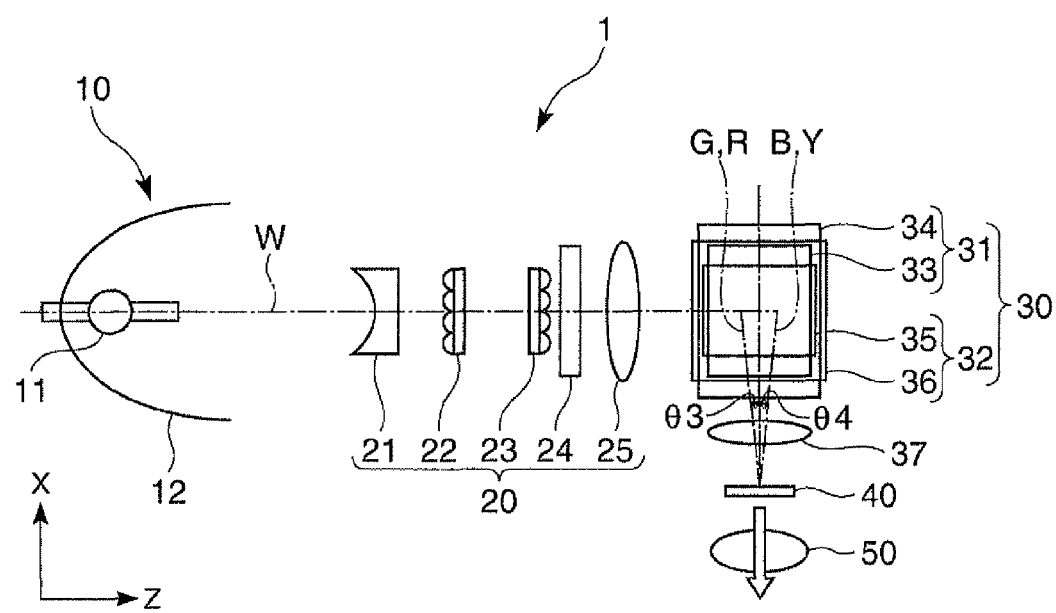

FIG. 1A is a side view of a projector 1 according to the first embodiment viewed from a horizontal direction, and FIG. 1B is a top view of the projector 1 viewed from a vertical direction.

The projector 1 is provided with a light source 10 for emitting the non-polarized light W including the visible light, a polarization conversion optical system 20 for converting the light W emitted from the light source 10 into the light (e.g., the S-polarized light) with the polarization direction aligned, a light separation optical system 30 for separating the light W from the light source 10 into four types of colored light (third light G, fourth light B, fifth light R, and sixth light Y) in respective wavelength bands different from each other, a single light modulation element 40 for modulating the four types of colored light G, B, R, Y based on image information supplied from the outside to thereby form a color optical image, and a projection optical system 50 for projecting the color optical image thus formed to a projection surface not shown.

The light source 10 is provided with a light source lamp 11 for radially emitting the light W, and a reflector 12 for emitting the light W, which is radiated by the light source lamp 11, toward one direction. It should be noted that as the light source lamp 11, there can be used a high-pressure mercury lamp, a metal halide lamp, a halogen lamp, a xenon lamp, and so on. As the reflector 12, there can be used a paraboloidal reflector, a ellipsoidal reflector, spherical reflector, and so on.

The polarization conversion optical system 20 is provided with a concave lens 21 for roughly collimating the light W emitted from the light source 10 and then emitting the result, a first lens array (a light beam dividing element) 22 and a second lens array (a light collecting optical element) 23 as an integrator optical system for equalizing the illuminance distribution of the light W emitted from the concave lens 21, a polarization conversion element 24 for aligning two types of polarized light (P-polarized light, S-polarized light) included in the non-polarized light W into single polarized light (e.g., the S-polarized light) and then emitting the result, and an overlapping lens (an overlapping element) 25. It should be noted that since the polarization conversion optical system 20 is a known technology disclosed in detail in, for example, JP-A-8-304739, the detailed explanation thereof will be omitted.

The light separation optical system 30 is provided with a first light separation optical system 31 composed of a first reflecting element 33 and a second reflecting element 34, a second light separation optical system 32 composed of a third reflecting element 35 and a fourth reflecting element 36, and a light collecting lens 37 for collecting the light emitted from the second light separation optical system 32 into the light modulation element 40.

The light separation optical system 30 separates the light W, which is emitted from the light source 10, in two directions, namely two-dimensionally, using the first light separation optical system 31 and the second light separation optical system 32. Further, although the details will be explained later, the third light G, the fourth light B, the fifth light R, and the sixth light Y thus separated into are made to enter the light modulation element 40 from respective directions different from each other, and the third light G, the fourth light B, the fifth light R, and the sixth light Y are made to be modulated by the respective sub-pixels different from each other of the light modulation element 40.

The light modulation element 40 is provided with a plurality of pixels. The light modulation element 40 is a transmissive liquid crystal device for performing light modulation on the third light G, the fourth light B, the fifth light R, and the sixth light Y separated into by the light separation optical system 30 based on the image information supplied from the outside not shown independently of each other to thereby form the color optical image, and then emitting it from the opposite side to the entrance side toward the projection optical system 50. The light modulation element 40 has a configuration of sandwiching, for example, a VA mode liquid crystal layer between a pair of substrates not shown. In each of the pixels of the light modulation element 40, there are disposed a first sub-pixel for modulating the third light G, a second sub-pixel for modulating the fourth light B, a third sub-pixel for modulating the fifth light R, and a fourth sub-pixel for modulating the sixth light Y. These four sub-pixels are arranged in the Y direction and the Z direction in a 2×2 matrix.

Figure 2:
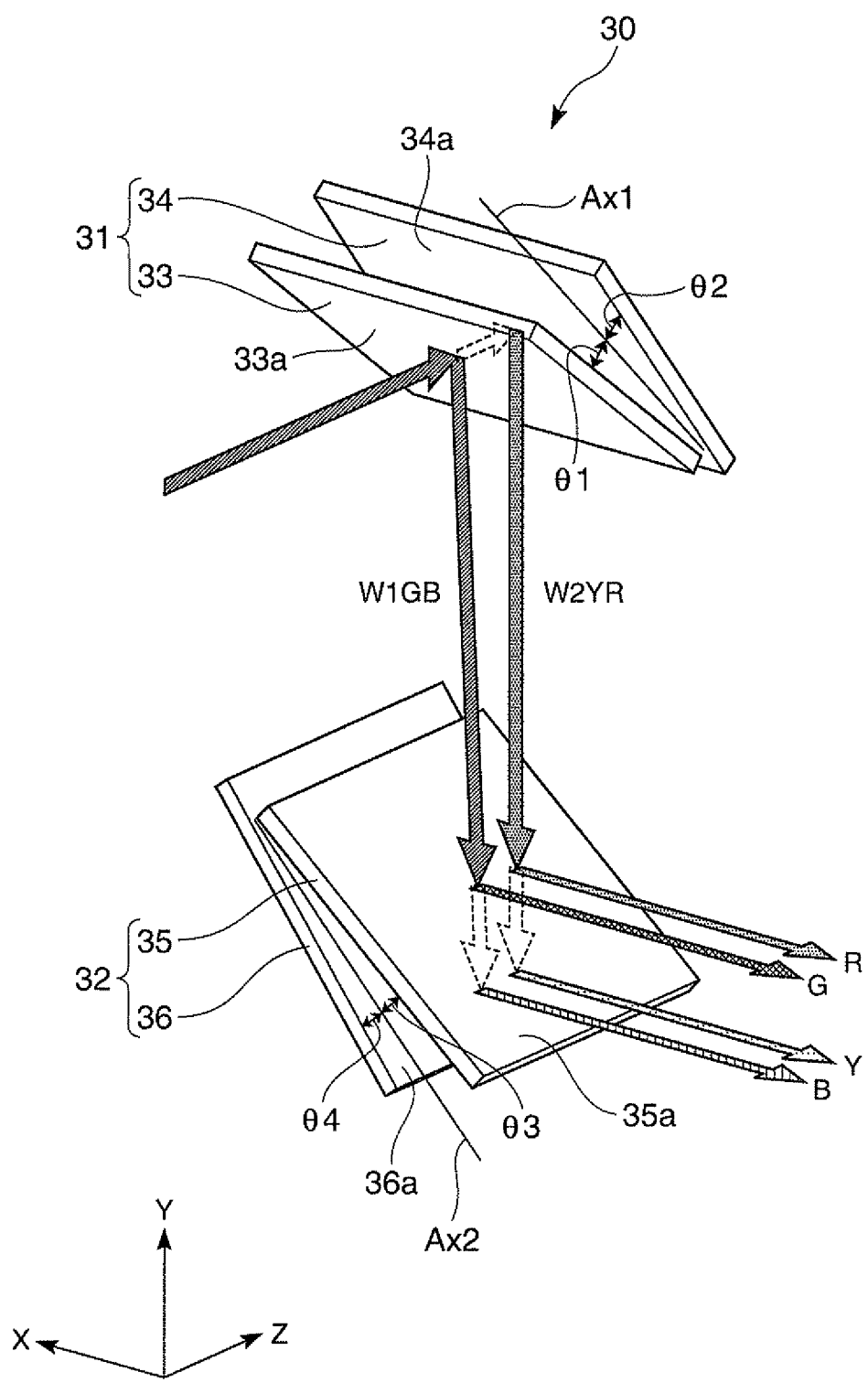
FIG. 2 is a schematic diagram showing a light separation optical system according to the first embodiment.

FIG. 2 is a schematic diagram of the light separation optical system 30.

The light separation optical system 30 is provided with the first light separation optical system 31, and the second light separation optical system 32.

The first light separation optical system 31 separates the light W emitted from the light source 10 into first light W1GB and second light W2YR. Here, the XYZ coordinate system is set so that the light axis direction of the light W emitted from the light source 10 coincides with the Z-axis direction, and the light axis direction of the first light W1GB roughly coincides with the Y-axis direction.

The second light separation optical system 32 separates the first light W1GB into the third light G of a first color and the fourth light B of a second color, and the second light W2YR into the fifth light R of a third color and the sixth light Y of a fourth color. Further, the second light separation optical system 32 emits the third light G, the fourth light B, the fifth light R, and the sixth light Y in the respective directions intersecting with the Y-Z plane.

As described above, the first light separation optical system 31 separates the light proceeding in the Z-axis direction into the two lights proceeding roughly in the Y-axis direction, and the second light separation optical system 32 further separates each of the lights proceeding roughly in the Y-axis direction into the two lights proceeding in the respective directions intersecting with the Y-Z plane. Therefore, in the present specification, such light separation is described as "the light W emitted from the light source 10 is separated by the first light separation optical system and the second light separation optical system in two directions, namely two-dimensionally."

The light collecting lens 37 collects the third light G, the fourth light B, the fifth light R, and the sixth light Y emitted from the second light separation optical system 32 toward the light modulation element 40.

Although in the case of the present embodiment, the third light G is green light (light with a wavelength not shorter than 520 nm and shorter than 560 nm), the fourth light B is blue light (light with a wavelength not shorter than 380 nm and shorter than 520 nm), the fifth light R is red light (light with a wavelength not shorter than 600 nm and shorter than 750 nm), and the sixth light Y is yellow light (light with a wavelength not shorter than 560 nm and shorter than 600 nm), the third light, the fourth light, the fifth light, and the sixth light are not limited thereto. It should be noted that in consideration of the fact that the color gamut, which can be expressed by the display element at present using the three primary colored lights of red light, green light, and blue light, is considerably narrow in particular in the wavelength band in the vicinity of the range from 490 nm to 570 nm with respect to the color gamut, which can be sensed by the human, that the human luminosity factor is high with respect to the green light and that the green light greatly affects the resolution of the image when viewed it is preferable to separate the green light into two wavelength bands (the green light on the short wavelength side, the green light (the yellow light) on the long wavelength side), and to modulate the result independently of each other.

The first light separation optical system 31 includes the first reflecting element 33 for reflecting the first light W1GB and transmitting the second light W2YR, and the second reflecting element 34 for reflecting the second light W2YR. The second light separation optical system 32 includes the third reflecting element 35 for reflecting the third light G and the fifth light R, and transmitting the fourth light B and the sixth light Y, and the fourth reflecting element 36 for reflecting the fourth light B and the sixth light Y.

The first reflecting element 33 and the third reflecting element 35 are mirrors (dichroic mirrors) each provided with wavelength selectivity of transmitting or reflecting the colored light in a specific wavelength band. The second reflecting element 34 reflects the light, which has been transmitted through the first reflecting element 33, toward the direction intersecting with the Z axis. The fourth reflecting element 36 reflects the light, which has been transmitted through the third reflecting element 35, toward the direction intersecting with the Y-Z plane. Therefore, the second reflecting element 34 and the fourth reflecting element 36 can be ordinary mirrors, or dichroic mirrors can also be used. If dichroic mirrors are used, since only the light in the specific wavelength band can selectively be reflected, it becomes easy to improve the chromatic purity of the illumination light. Further, if the dichroic mirror for transmitting the infrared light or the ultraviolet light is used, deterioration of the light modulation element can be reduced.

Although it is assumed in FIG. 2 that the third light G reflected by the first reflecting element 33 and the third reflecting element 35 is the green light, the third light G is not limited thereto. It should be noted that for the following reason, it is preferable that the third light is set to the green light or the yellow light having a higher luminosity factor. That is, the third light G, the fourth light B, the fifth light R, and the sixth light Y are different from each other in the light path length to the light modulation element. If the light path length to the light modulation element increases, the light enters the light modulation element in the state of being widely spread, and therefore, the light intensity of the light entering the display area of the light modulation element is lowered to thereby cause dark display. The third light G is reflected by the first reflecting element 33 and the third reflecting element 35, and therefore the light path length thereof to the light modulation element is the shortest. Therefore, the spread of the light is the narrowest, and bright display can be obtained. Therefore, by setting the third light G to the green light or the yellow light with the higher human luminosity factor, image display with preferable visibility can be obtained.

The reflecting surface 33a of the first reflecting element 33 is tilted with respect to the reflecting surface 34a of the second reflecting element 34, and the reflecting surface 35a of the third reflecting element 35 is tilted with respect to the reflecting surface 36a of the fourth reflecting element 36.

For example, defining an imaginary axis forming an angle of 45° with the light axis (the Z axis) of the light W entering the first light separation optical system 31 as a first axis Ax1, the angle ($\theta 1$) formed between the reflecting surface 33a of the first reflecting element 33 and the first axis Ax1 is equal to the angle ($\theta 2$) formed between the reflecting surface 34a of the second reflecting element 34 and the first axis Ax1.

Further, defining an imaginary axis forming an angle of 45° with an imaginary axis perpendicular to both the light axis (the Z axis) of the light W entering the first light separation optical system 31 and the first axis Ax1 as a second axis Ax2, the angle ($\theta 3$) formed between the reflecting surface 35a of the third reflecting element 35 and the second axis Ax2 is equal to the angle ($\theta 4$) formed between the reflecting surface 36a of the fourth reflecting element 36 and the second axis Ax2.

According to this configuration, it is possible to make the third light G, the fourth light B, the fifth light R, and the sixth light Y enter the light modulation element 40 from four directions, respectively, at angles with a reference direction equal to each other. The reference direction denotes, for example, the surface normal of the light modulation element 40. It should be noted that in the case of the present embodiment, the angles $\theta 1$, $\theta 2$, $\theta 3$, and $\theta 4$ are all r, but the angles $\theta 1$, $\theta 2$, $\theta 3$, and $\theta 4$ are not limited thereto.

In the present embodiment, the reflecting surfaces 33a, 34a, 35a, and 36a are disposed so that the plane (the X-Y plane) including the light axis of the third light G and the light axis of the fourth light B is perpendicular to the plane (the X-Z plane) including the light axis of the third light G and the light axis of the fifth light R. Thus, it becomes possible to separate the light W emitted from the light source 10 two-dimensionally in two directions.

Figures 3A, 3B, 3C:
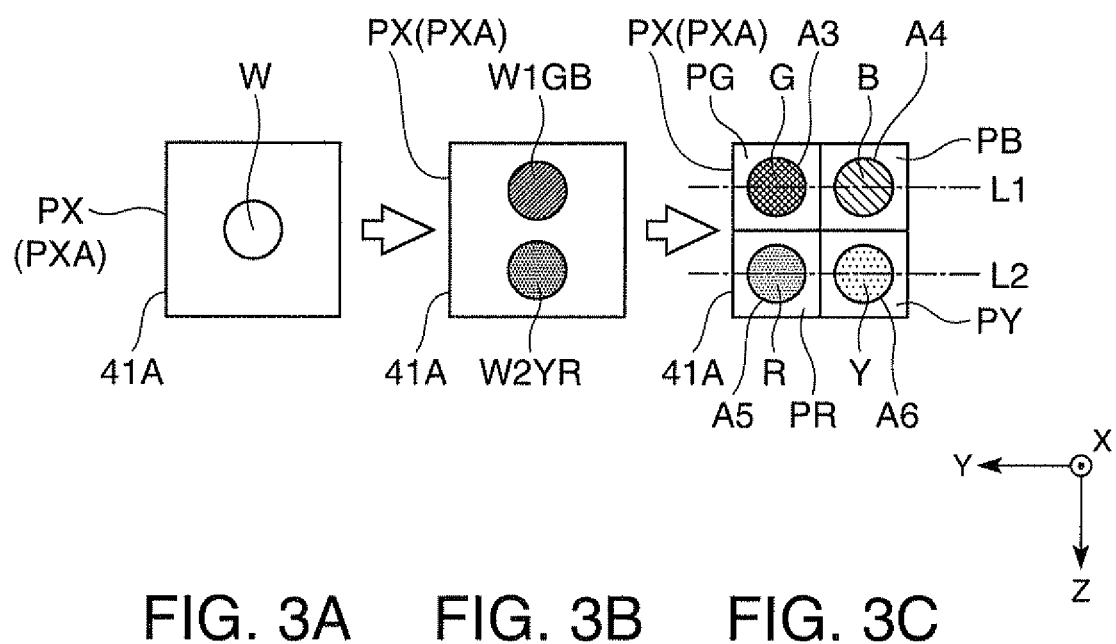
FIGS. 3A through 3C are schematic diagrams showing how the color separation is performed by the light separation optical system.
Figure 4A:
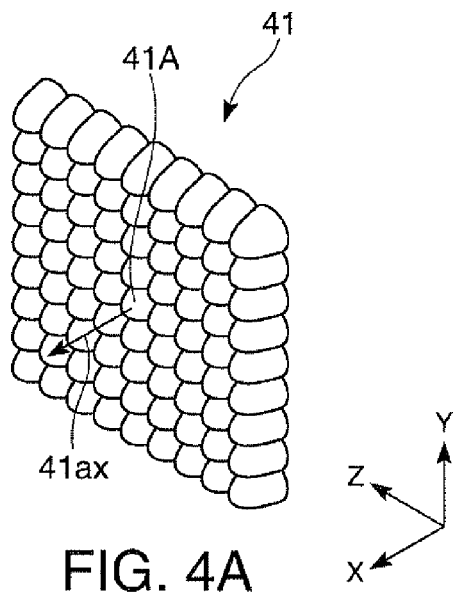
FIGS. 4A through 4C are diagrams for explaining a configuration and a function of a microlens array.

FIGS. 3A through 3C are schematic diagrams showing how the color separation is performed by the first light separation optical system 31 and the second light separation optical system 32. FIG. 4A is a perspective view of the microlens array 41 provided with a plurality of microlenses. The microlens array 41 is disposed on the light entrance side of the light modulation element 40. FIG. 3A shows one pixel PXA out of the plurality of pixels PX, and one microlens 41A out of the plurality of microlenses is disposed so as to correspond to the pixel PXA. FIG. 3A is a plan view of the pixel PXA when making the light W from the light source directly enter the pixel PXA of the light modulation element via the microlens 41A without performing the color separation. FIG. 3B is a plan view of the pixel PXA when making the light W from the light source enter the pixel PXA of the light modulation element via the microlens 41A without performing the color separation by the second light separation optical system after separating the light W into the first light W1GB and the second light W2YR by the first light separation optical system. FIG. 3C is a plan view of the pixel PXA when making the light W from the light source enter the pixel PXA of the light modulation element 40 via the microlens 41A after separating the light W into the third light G, the fourth light B, the fifth light R, and the sixth light Y by the first light separation optical system and the second light separation optical system.

It should be noted that the light modulation element 40 includes a first sub-pixel PG disposed corresponding to the third light G, a second sub-pixel PB disposed corresponding to the fourth light B, a third sub-pixel PR disposed corresponding to the fifth light R, and a fourth sub-pixel PY disposed corresponding to the sixth light Y in each of the pixels PX. Out of the light entering the microlens array 41, the microlens 41A collects a part of the third light G toward the first sub-pixel PG, collects a part of the fourth light B toward the second sub-pixel PB, collects a part of the fifth light R toward the third sub-pixel PR, and collects a part of the sixth light Y toward the fourth sub-pixel PY. Here, "a part of the third light G," for example, denotes the light entering the microlens 41A out of the third light G. The pixel PXA and the microlens 41A are formed to have dimensions and shapes so as to completely overlap each other in a plan view when viewed from the central axis direction of the microlens 41A. Each of the pixels PX is provided with the four roughly square sub-pixels (the first sub-pixel PG, the second sub-pixel PB, the third sub-pixel PR, and the fourth sub-pixel PY) for performing the light modulation independently of each other, and the four sub-pixels are arranged two-dimensionally in two directions perpendicular to each other to thereby form each of the pixels PX having a roughly square shape. By forming each of the pixels PX to have a roughly square shape, it becomes difficult for the degradation of the resolution of the image to occur in either of the vertical direction and the horizontal direction of the image.

The shape of the first sub-pixel PG is a necessary and sufficient shape for being capable of including the light collected by the microlens 41A toward the first sub-pixel PG, the shape of the second sub-pixel PB is a necessary and sufficient shape for being capable of including the light collected by the microlens 41A toward the second sub-pixel PB, the shape of the third sub-pixel PR is a necessary and sufficient shape for being capable of including the light collected by the microlens 41A toward the third sub-pixel PR, and the shape of the fourth sub-pixel PY is a necessary and sufficient shape for being capable of including the light collected by the microlens 41A toward the fourth sub-pixel PY. By matching the collected images of the microlens 41A and the respective shapes of the sub-pixels as described above, it becomes possible to achieve improvement in light efficiency and downsizing of the light modulation element.

As shown in FIG. 3A, if the light W from the light source is not separated by either of the first light separation optical system or the second light separation optical system, the light W passes through the central axis of the microlens 41A and then enters the central part of the pixel PXA.

As shown in FIG. 3B, if the light W is separated by the first light separation optical system into the first light W1GB and the second light W2YR, the first light W1GB and the second light W2YR enter the respective positions in the pixel PXA different from each other. The direction connecting the position which the first light W1GB enters and the position which the second light W2YR enters in the pixel PXA is defined as a first direction.

As shown in FIG. 3O, if the first light W1GB and the second light W2YR separated into by the first light separation optical system are further separated by the second light separation optical system, the first light W1GB is separated into the third light G and the fourth light B in a direction intersecting the first direction. Further, the second light W2YR is separated into the fifth light R and the sixth light Y in a direction intersecting the first direction.

In each of the pixels PX, the position irradiated with the third light G is defined as a position A3, the position irradiated with the fourth light B is defined as a position A4, the position irradiated with the fifth light R is defined as a position A5, and the position irradiated with the sixth light Y is defined as a position A6. Further, the straight line connecting the position A3 and the position A4 is defined as a straight line L1, and the straight line connecting the position A5 and the position A6 is defined as a straight line L2. According to the present embodiment, the straight line L1 does not coincide with the straight line L2. The coincidence of the straight line L1 with the straight line L2 means the fact that first sub-pixel PG, the second sub-pixel PB, the third sub-pixel PR, and the fourth sub-pixel PY are arranged one-dimensionally. As shown in FIG. 3C, the positions A3, A4, A5, and A6 are located in each of the pixels PX in a pseudo matrix.

Therefore, the first sub-pixel PG which the third light G should enter, the second sub-pixel PB which the fourth light B should enter, the third sub-pixel PR which the fifth light R should enter, and the fourth sub-pixel PY which the sixth light Y should enter can be arranged in each of the pixels PX two-dimensionally in a matrix.

Figure 4B:
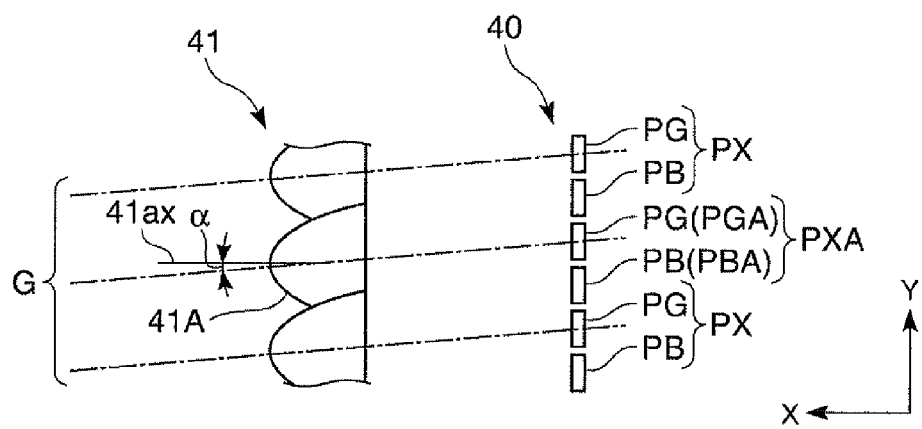
Figure 4C:
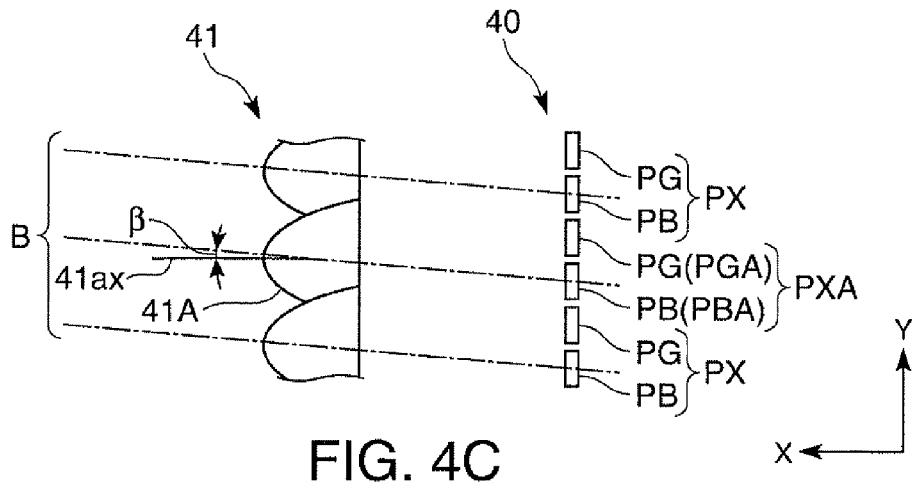

FIG. 4A is a perspective view of the microlens array 41 provided with a plurality of microlenses. FIGS. 4B and 4C are diagrams showing how the third light G and the fourth light B are spatially separated by the microlens array 41, and then enter the first sub-pixel PG and the second sub-pixel PB, respectively.

As shown in FIG. 4A, the microlens array 41 is provided with a plurality of microlenses arranged in two directions (the Y direction and the Z direction) perpendicular to each other. The one microlens 41A out of the plurality of microlenses is an aspherical lens having a roughly square planar shape viewed from a direction of the center axis 41ax (X direction) thereof, and a mound-like cross-sectional shape cut by a plane parallel to the X-Y plane passing through the center axis 41ax thereof. The microlens array 41 can also be incorporated in the light modulation element 40, or can be provided on the light entrance side of the light modulation element 40 separately from the light modulation element 40.

Here, one of the pixels PX corresponding to the microlens 41A is defined as the pixel PXA. Further, the first sub-pixel PG provided to the pixel PXA is defined as the first sub-pixel PGA, and the second sub-pixel PB provided to the pixel PXA is defined as the second sub-pixel PBA.

As shown in FIG. 4B, the third light G enters the microlens array 41 from a direction at an angle α with the center axis 41ax of the microlens 41A. Out of the third light G, the light having entered the microlens 41A is collected by the microlens 41A toward the first sub-pixel PGA, and then enters roughly the central part of the first sub-pixel PGA.

As shown in FIG. 4C, the fourth light B enters the microlens array 41 from a direction at an angle β with the center axis 41ax of the microlens 41A. Out of the fourth light B, the light having entered the microlens 41A is collected by the microlens 41A toward the second sub-pixel PEA, and then enters roughly the central part of the second sub-pixel PBA.

By arranging that the angle α is roughly equal to the angle β, the area irradiated with the light having entered the microlens 41A out of the third light G and the area irradiated with the light having entered the microlens 41A out of the fourth light B become symmetric about a plane passing through the center axis 41ax and parallel to the Z axis in the pixel PXA. The same can be applied to the other of the pixels PX.

Therefore, by appropriately setting the angle α and the angle β, it is possible to regularly arrange the plurality of first sub-pixels PG and the plurality of second sub-pixels PB alternately in the Y-axis direction.

Although the third light G and the fourth light B are explained using FIGS. 4B and 4C, the fifth light R enters the third sub-pixel PRA, and the sixth light Y enters the fourth sub-pixel PYA in a similar manner.

Further, how the light proceeds when viewed from the Z-axis direction is illustrated in FIGS. 4B and 4C, and since substantially the same can be applied to how the light proceeds when viewed from the Y-axis direction, the explanation therefor will be omitted.

The power (the refractive power) of the microlens 41A varies in accordance with the height (the thickness in the X direction) of the microlens 41A. The higher the height of the microlens 41A is, the higher the power is, but the more difficult the manufacturing thereof is. In the present embodiment, the four sub-pixels are arranged in the 2×2 matrix in the area opposed to the microlens 41A, and the microlens 41A is only required to spatially separate the four lights having entered from the directions symmetrical about the center axis 41ax of the microlens 41A in two directions perpendicular to each other. Therefore, it is not required to set the power of the microlens 41A to be so high. Therefore, it becomes easy to manufacture the microlens 41A.

As described above, according to the projector 1 of the present embodiment, it is possible to separate the light W emitted from the light source 10 in two directions using the first light separation optical system 31 and the second light separation optical system 32 to thereby generate the third light G, the fourth light B, the fifth light R, and the sixth light Y different in color from each other. Therefore, the first sub-pixel PG which the third light G enters, the second sub-pixel PB which the fourth light B enters, the third sub-pixel PR which the fifth light R enters, and the fourth sub-pixel PY which the sixth light Y enters can be arranged two-dimensionally. Therefore, the projector with which the resolution of the image is difficult to be degraded can be provided. In particular in the present embodiment, since the first sub-pixel PG, the second sub-pixel PB, the third sub-pixel PR, and the fourth sub-pixel PY are arranged in a 2×2 matrix, a high quality image can be displayed.

Second Embodiment

Figure 5:
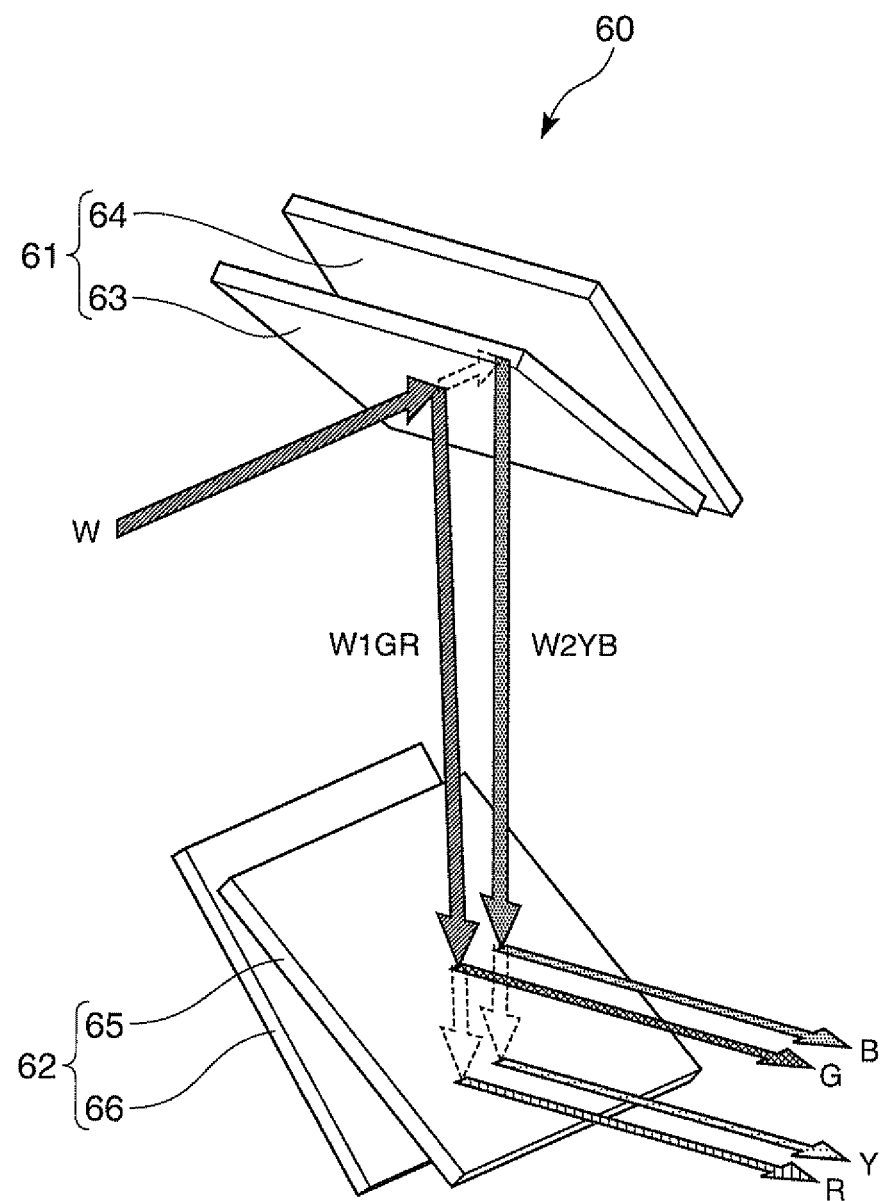
FIG. 5 is a schematic diagram of a light separation optical system of a projector according to a second embodiment of the invention.

FIG. 5 is a schematic diagram of a light separation optical system 60 used in a projector according to a second embodiment. In the present embodiment, the constituents common to the present embodiment and the first embodiment are denoted by the same reference symbols, and the detailed explanation therefor will be omitted.

The point in which the light separation optical system 60 is different from the light separation optical system 30 according to the first embodiment is the point that the transmission wavelength and the reflection wavelength of the first reflecting element 63 and the third reflecting element 65 of the light separation optical system 60 are different from the transmission wavelength and the reflection wavelength of the first reflecting element 33 and the third reflecting element 35 of the light separation optical system 30 according to the first embodiment.

The first light separation optical system 61 includes the first reflecting element 63 for reflecting the first light W1GR and transmitting the second light W2YB, and the second reflecting element 64 for reflecting the second light W2YB. The second light separation optical system 62 includes the third reflecting element 65 for reflecting the third light G and the fifth light B, and transmitting the fourth light R and the sixth light Y, and the fourth reflecting element 66 for reflecting the fourth light R and the sixth light Y.

In the case of the present embodiment, the third light G is the green light (the light with a wavelength not shorter than 520 nm and shorter than 560 nm), the fourth light R is the red light (the light with a wavelength not shorter than 600 nm and shorter than 750 nm), the fifth light B is the blue light (the light with a wavelength not shorter than 380 nm and shorter than 520 nm), and the sixth light Y is the yellow light (the light with a wavelength not shorter than 560 nm and shorter than 600 nm).

The positional relationship between the first reflecting element 63 and the second reflecting element 64, and the positional relationship between the third reflecting element 65 and the fourth reflecting element 66 are the same as the positional relationship between the first reflecting element 33 and the second reflecting element 34, and the positional relationship between the third reflecting element 35 and the fourth reflecting element 36 in the first embodiment, respectively.

Figures 6A, 6B, 6C:
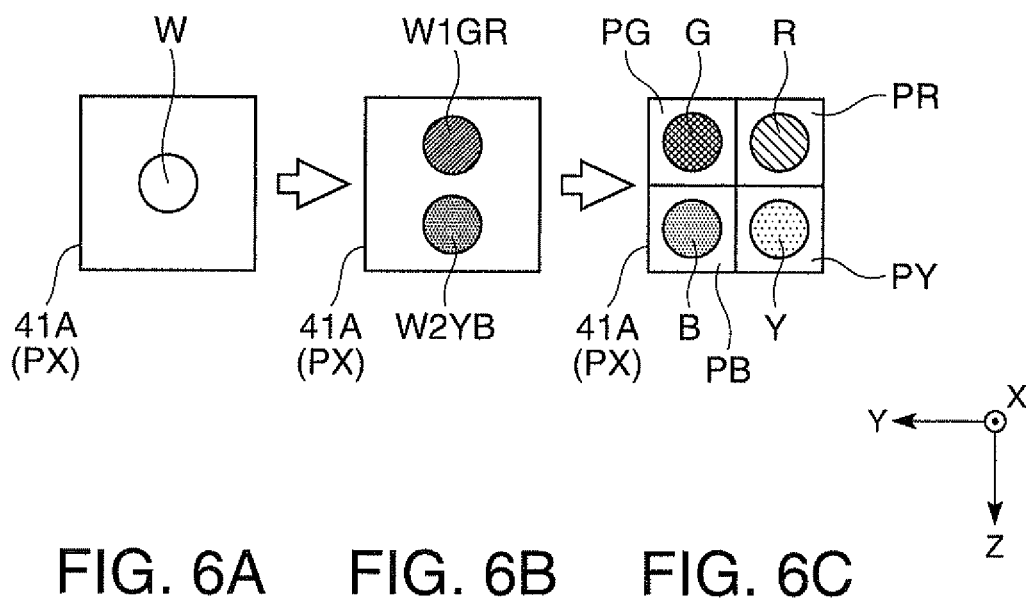
FIGS. 6A through 6C are schematic diagrams showing how the color separation is performed by the light separation optical system.

FIGS. 6A through 6C are schematic diagrams showing how the color separation is performed by the first light separation optical system and the second light separation optical system.

In the case of the present embodiment, the first light separation optical system 61 separates the light W emitted from the light source into the first light W1GR and the second light W2YB. Here, the XYZ coordinate system is set so that the light axis direction of the light W emitted from the light source 10 coincides with the Z-axis direction, and the light axis direction of the first light W1GR roughly coincides with the Y-axis direction.

The second light separation optical system 62 separates the first light W1GR into the third light G and the fourth light R, and separates the second light W2YB into the fifth light B and the sixth light Y. Further, the second light separation optical system 62 emits the third light G, the fourth light R, the fifth light B, and the sixth light Y in the respective directions intersecting with the Y-Z plane. Similarly to the first embodiment, the positions A3, A4, A5, and A6 are located in each of the pixels PX in a pseudo matrix.

Thus, the sub-pixel PG which the third light G enters, the sub-pixel PR which the fourth light R enters, the sub-pixel PB which the fifth light B enters, and the sub-pixel PY which the sixth light Y enters can be arranged in a 2×2 matrix. Therefore, similarly to the first embodiment, the projector with which the resolution of the image is difficult to be degraded can be provided.

Third Embodiment

Figure 7:
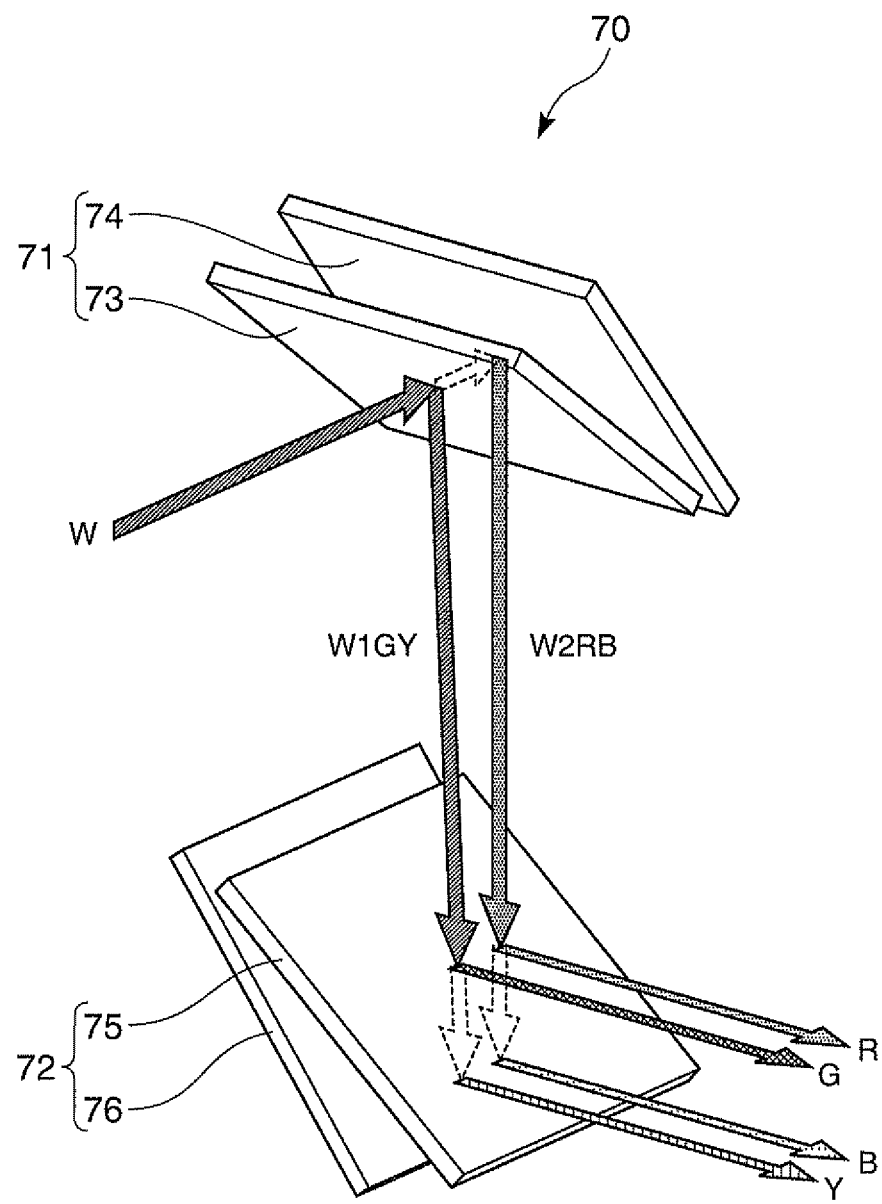
FIG. 7 is a schematic diagram of a light separation optical system of a projector according to a third embodiment of the invention.

FIG. 7 is a schematic diagram of a light separation optical system 70 used in a projector according to a third embodiment. In the present embodiment, the constituents common to the present embodiment and the first embodiment are denoted by the same reference symbols, and the detailed explanation therefor will be omitted.

The point in which the light separation optical system 70 is different from the light separation optical system 30 according to the first embodiment is the point that the transmission wavelength and the reflection wavelength of the first reflecting element 73 and the third reflecting element 75 of the light separation optical system 70 are different from the transmission wavelength and the reflection wavelength of the first reflecting element 33 and the third reflecting element 35 of the light separation optical system 30 according to the first embodiment.

The first light separation optical system 71 includes the first reflecting element 73 for reflecting the first light W1GY and transmitting the second light W2RB, and the second reflecting element 74 for reflecting the second light W2RB. The second light separation optical system 72 includes the third reflecting element 75 for reflecting the third light G and the fifth light R, and transmitting the fourth light Y and the sixth light B, and the fourth reflecting element 76 for reflecting the fourth light Y and the sixth light B.

In the case of the present embodiment, the third light G is the green light (the light with a wavelength not shorter than 520 nm and shorter than 560 nm), the fourth light Y is the yellow light (the light with a wavelength not shorter than 560 nm and shorter than 600 nm), the fifth light R is the red light (the light with a wavelength not shorter than 600 nm and shorter than 750 nm), and the sixth light B is the blue light (the light with a wavelength not shorter than 380 nm and shorter than 520 nm).

The positional relationship between the first reflecting element 73 and the second reflecting element 74, and the positional relationship between the third reflecting element 75 and the fourth reflecting element 76 are the same as the positional relationship between the first reflecting element 33 and the second reflecting element 34, and the positional relationship between the third reflecting element 35 and the fourth reflecting element 36 in the first embodiment, respectively.

Figures 8A, 8B, 8C:
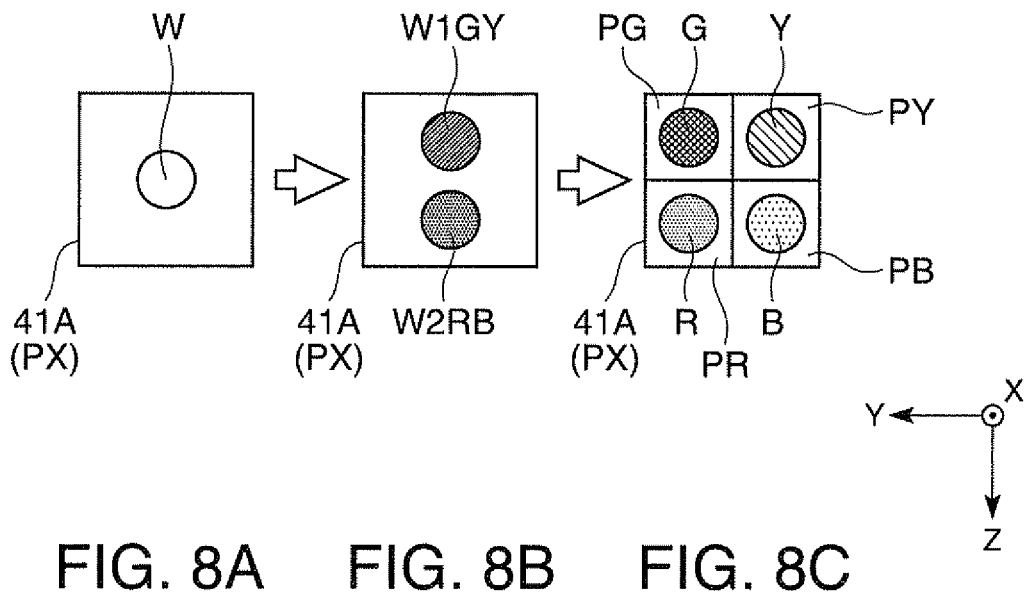
FIGS. 8A through 8C are schematic diagrams showing how the color separation is performed by the light separation optical system.

FIGS. 8A through 8C are schematic diagrams showing how the color separation is performed by the first light separation optical system and the second light separation optical system.

In the case of the present embodiment, the first light separation optical system 71 separates the light W emitted from the light source into the first light W1GY and the second light W2RB. Here, the XYZ coordinate system is set so that the light axis direction of the light W emitted from the light source 10 coincides with the Z-axis direction, and the light axis direction of the first light W1GY coincides with the Y-axis direction.

The second light separation optical system 72 separates the first light W1GY into the third light G and the fourth light Y, and separates the second light W2RB into the fifth light R and the sixth light B. Further, the second light separation optical system 72 emits the third light G, the fourth light Y, the fifth light R, and the sixth light B in the respective directions intersecting with the Y-Z plane. Also in the present embodiment, the positions A3, A4, A5, and A6 are located in each of the pixels PX in a pseudo matrix.

Thus, the sub-pixel PG which the third light G enters, the sub-pixel PY which the fourth light Y enters, the sub-pixel PR which the fifth light R enters, and the sub-pixel PB which the sixth light B enters can be arranged in a 2×2 matrix. Therefore, similarly to the first embodiment, the projector with which the resolution of the image is difficult to be degraded can be provided.

Fourth Embodiment

Figure 9:
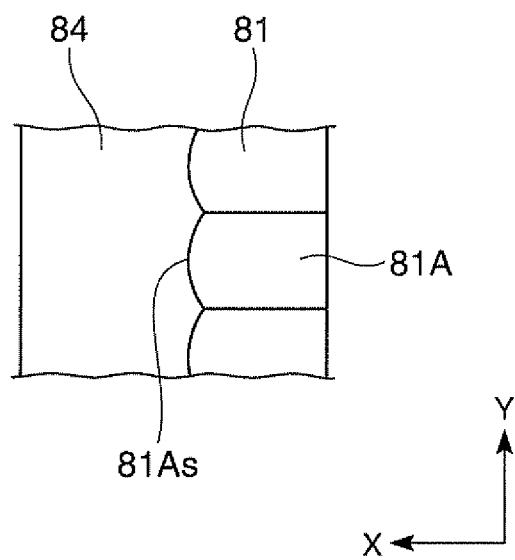
FIG. 9 is a cross-sectional view of a microlens array according to a fourth embodiment of the invention.
Figure 10A:
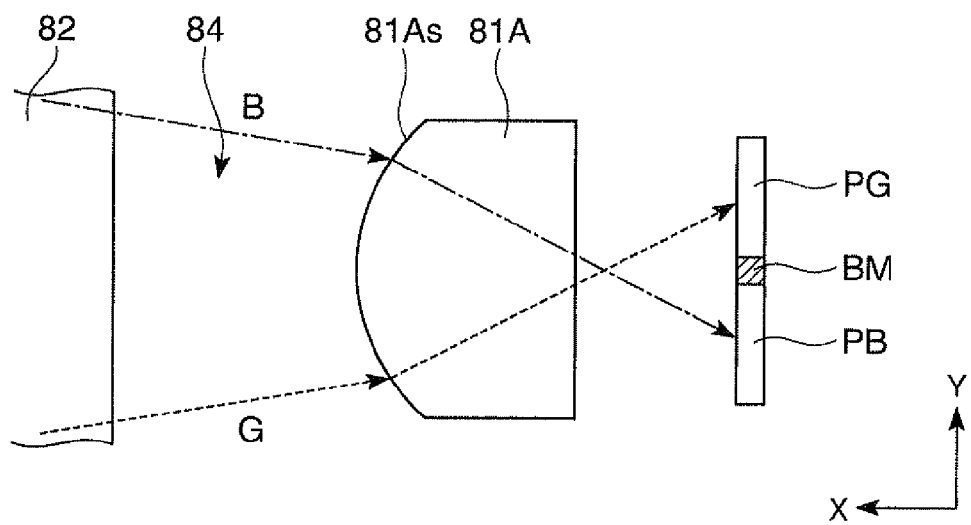
FIGS. 10A and 10B are diagrams showing the state of refraction of the light in the case of providing a low-refractive index layer or a high-refractive index layer on a lens surface side of the microlens in the fourth embodiment.
Figure 10B:
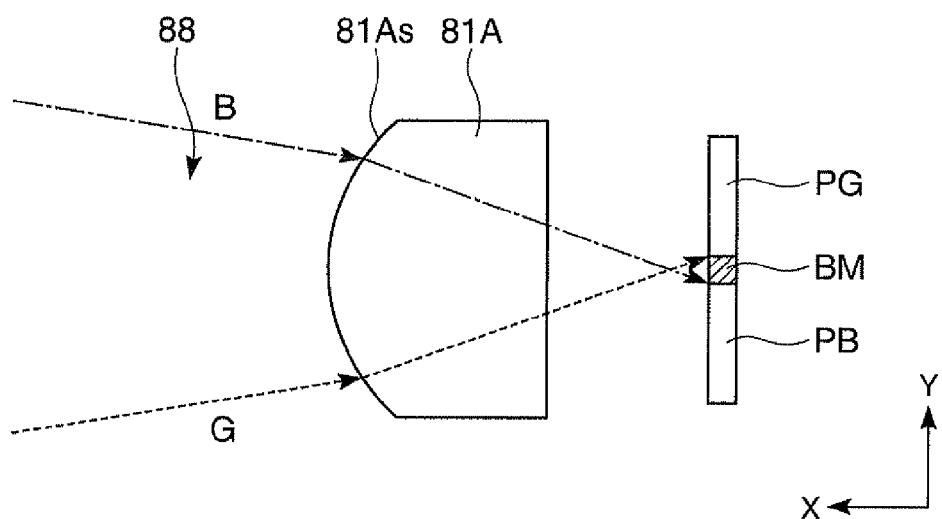
Figure 11:
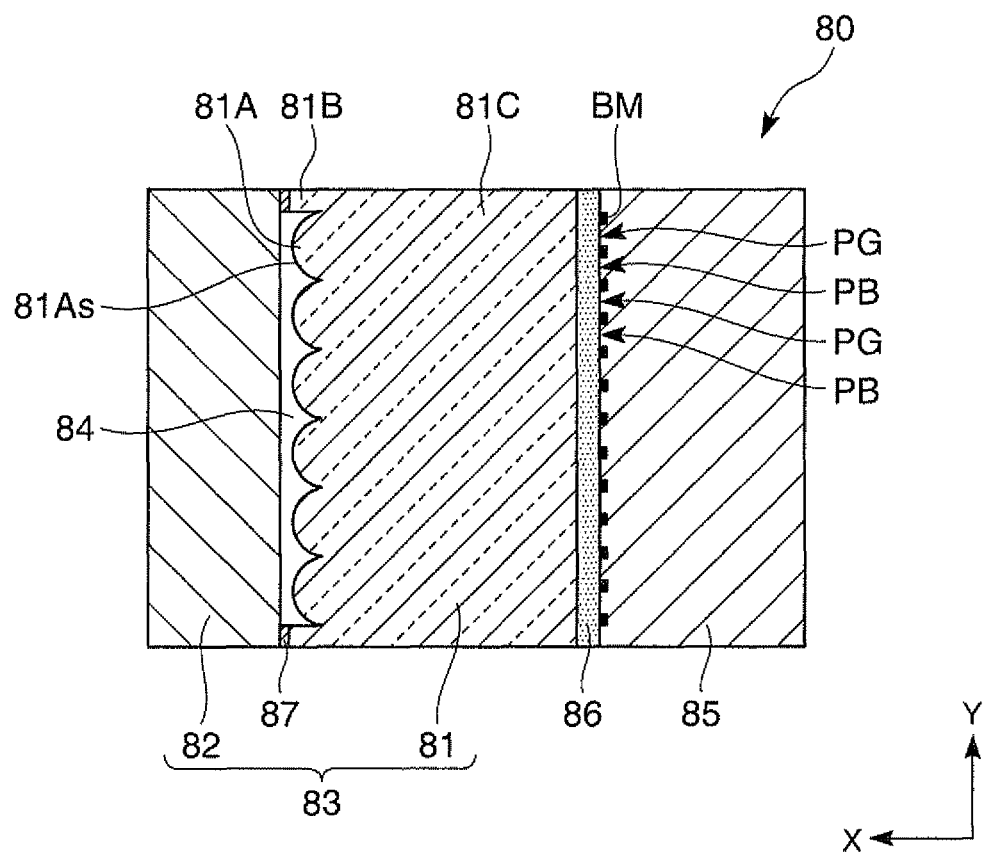
FIG. 11 is a cross-sectional view of a light modulation element of the fourth embodiment.

FIG. 9 is a cross-sectional view of a microlens array 81 applied to a projector according to a fourth embodiment. FIGS. 10A and 10B are diagrams showing the state of refraction of the light in the case of providing a low-refractive index layer or a high-refractive index layer on a lens surface side of the microlens in the fourth embodiment. FIG. 11 is a cross-sectional view of a light modulation element of the fourth embodiment.

The major difference between the projector according to the present embodiment and the projector according to the first embodiment is the shape of the lens surface of the microlens provided to the microlens array, and the point that the low-refractive index layer is disposed on the lens surface side of the microlens. In the present embodiment, the constituents common to the present embodiment and the first embodiment are denoted by the same reference symbols, and the detailed explanation therefor will be omitted. The projector according to the present embodiment is provided with the microlens array 81 instead of the microlens array 41, and is further provided with a light modulation element 80 instead of the light modulation element 40.

As shown in FIG. 11, the light modulation element 80 is a transmissive liquid crystal device. The light modulation element 80 is provided with a plurality of pixels PX similarly to the light modulation element 40, and each of the pixels PX includes the first sub-pixel PG disposed corresponding to the third light G, the second sub-pixel PB disposed corresponding to the fourth light B, the third sub-pixel PR disposed corresponding to the fifth light R, and the fourth sub-pixel PY disposed corresponding to the sixth light Y. Although only the first sub-pixel PG and the second sub-pixel PB are illustrated in FIG. 11, in reality, the third sub-pixel PR and the fourth sub-pixel PY are disposed on the back side of the sheet of the first sub-pixel PG and the second sub-pixel PB, respectively. These four sub-pixels are arranged in the Y direction and the Z direction in a 2×2 matrix, and are further partitioned by a grid-like black matrix BM. Further, the light modulation element 80 incorporates the microlens array 81 described later. It should be noted that the configuration of the light modulation element 80 will be explained in detail in the later description.

The microlens array 81 is disposed on the light entrance side of the light modulation element 80. As is explained in the first embodiment using FIGS. 3A through 3C and 4A through 4C, the plurality of microlenses 81A is disposed corresponding to the plurality of pixels also in the present embodiment. Further, since the process of collecting the light to each of the sub-pixels using the microlens is the same as the process of the collection in the first embodiment, the detailed explanation will be omitted.

Since only the difference between the microlens array 81 and the microlens array 41 is the shape of the lens surface as shown in FIG. 9, the detailed explanation will be omitted. One microlens 81A out of the plurality of microlenses is a spherical lens having the lens surface 81As formed of a spherical surface. Further, as shown in FIG. 9, the low-refractive index layer 84 having a refractive index lower than that of the microlens 81A is disposed on the lens surface 81As side of the microlens 81A. The low-refractive index layer 84 is formed as the layer with the refractive index significantly lower than that of the microlens 81A, and is arranged so that significant light refraction is caused on the interface between the microlens 81A and the low-refractive index layer 84. The microlens array 81 can also be incorporated in the light modulation element 80, or can be provided on the light entrance side of the light modulation element 80 separately from the light modulation element 80. It should be noted that FIG. 11 shows an example in which the microlens array 81 is incorporated in the light modulation element 80.

FIG. 10A is a diagram showing the state of refraction of the light in the case of providing the low-refractive index layer 84 on the lens surface 81As side of the microlens 81A as in the present embodiment, and FIG. 10B is a schematic diagram showing the state of refraction of the light in the case of providing a high-refractive index layer 88 on the lens surface 81As side of the microlens 81A as a comparative example.

As shown in FIG. 10B, in the case of providing the high-refractive index layer 88 on the lens surface 81As side of the microlens 81A, since the difference between the refractive index of the microlens 81A and the refractive index of the high-refractive index layer 88 is relatively small, it is not achievable to significantly refract the light on the interface between the microlens 81A and the high-refractive index layer 88. As described above, in the projector according to the present embodiment, the four sub-pixels are arranged in the 2×2 matrix in the area opposed to the microlens 81A, and the four lights having entered from the directions symmetrical about the center axis of the microlens 81A are spatially separated in two directions perpendicular to each other. Therefore, even if the refractive power of the microlens 81A is not so high, it is easy to separate the light having entered the microlens 81A and then make the result enter the corresponding sub-pixels. However, if the difference in refractive index between the microlens 81A and the high-refractive index layer 88 is extremely small, there is a possibility that the light G and the light B having entered the microlens 81A do not sufficiently enter the targeted sub-pixels PG, PB, respectively, and a part of the light is blocked by the black matrix BM, and becomes unavailable. In order to avoid such a circumstance, it is sufficient to adopt the aspherical lens with high refractive power as the microlens 81A as explained in the first through third embodiments.

In contrast, in the present embodiment, the low-refractive index layer 84 is disposed on the lens surface 81As side of the microlens 81A as shown in FIG. 10A. In this case, since the difference between the refractive index of the microlens 81A and the refractive index of the low-refractive index layer 84 is sufficiently large, it is possible to significantly refract the light on the interface between the microlens 81A and the low-refractive index layer 84. In the projector according to the present embodiment, even if the refractive power of the microlens 81A is not so high, it is easy to separate the light having entered the microlens 81A and then make the result enter the corresponding sub-pixels Therefore, it becomes possible to use not only the aspherical lens with high refractive power but also the spherical lens with relatively low refractive power as the microlens 81A. The spherical lens is easy to manufacture compared to the aspherical lens, and can therefore be manufactured at lower cost, and at the same time, aberration can easily be reduced since roughly the same lens shape as designed can be obtained. Therefore, it becomes possible to make the light G and the light B having entered the microlens 81A respectively enter the targeted sub-pixels PG, PB with accuracy.

FIG. 11 is a schematic diagram showing the X-Y cross-sectional surface of the light modulation element 80 incorporating the microlens array 81.

The light modulation element 80 is provided with a first substrate 85 provided with circuit elements such as thin film transistors (TFT), a second substrate 83 provided with the microlens array 81, and a liquid crystal layer 86 sandwiched between the first substrate 85 and the second substrate 83.

The first substrate 85 is provided with the black matrix BM for partitioning the plurality of sub-pixels (the first sub-pixel PG, the second sub-pixel PB, the third sub-pixel PR, and the fourth sub-pixel PY).

Although not shown, on the light exit side (the opposite side to the liquid crystal layer 86 side) of the first substrate 85, and on the light entrance side (the opposite side to the liquid crystal layer 86 side) of the second substrate 83, there are respectively disposed polarization plates. Further, although not shown in the drawings, on the liquid crystal layer 86 side of the first substrate 85, there are formed pixel electrodes corresponding one-to-one to the sub-pixels, and on the liquid crystal layer 86 side of the second substrate 83, there is formed a common electrode common to the pixel electrodes in the entire display area.

The second substrate 83 is provided with the microlens array 81 provided with the plurality of microlenses 81A arranged in a matrix, and a transparent substrate 82 disposed on the light entrance side of the microlens array 81 so as to be opposed thereto, and made of a light transmitting material capable of transmitting the third light G, the fourth light B, the fifth light R, and the sixth light Y having entered the transparent substrate 82 from the light separation optical system 30.

The microlens 81A is formed by etching the surface of a transparent substrate 81C.

As the material of the transparent substrate 81C, a material with a high refractive index is used, and neoceram (the refractive index at the wavelength of 589.3 nm is 1.541), for example, is preferable. The central part of the transparent substrate 81C corresponds to a lens area having the plurality of microlenses 81A arranged in a matrix, and the periphery of the lens area corresponds to a non-lens area on which etching is not performed. The non-lens area forms a projection section 81B projecting toward the transparent substrate 82 from the microlens 81A. The projection section 81B is formed to have a rectangular frame shape along the four sides of the transparent substrate 81C having a rectangular shape, and the projection section 81B and the transparent substrate 82 are bonded to each other with a thin glassy bonding film 87 with a thickness of about 0.1 μm.

The thickness of the microlens array 81 is in a range of, for example, 40 μm through 50 μm. The microlens array 81 is bonded to the thick transparent substrate 82 with the thickness in a range of 1.0 mm through 1.4 mm to thereby be reinforced in rigidity.

A gap is formed between the microlens 81A and the transparent substrate 82, and the microlens 81A and the transparent substrate 82 are disposed so as not to have contact with each other with the gap. The gap between the microlens 81A and the transparent substrate 82 is sealed with the projection section 81B and the transparent substrate 82, and the gap is provided with the low-refractive index layer 84 with the refractive index lower than that of the microlens 81A. It is sufficient for the low-refractive index layer 84 to be a member for causing a significant difference in refractive index from the microlens 81A, and a gas layer formed of a gas such as air or a vacuum layer is preferable. In the case of the present embodiment, the microlens array 81 and the transparent substrate 82 are bonded to each other under a reduced-pressure atmosphere, and the gap (the low-refractive index layer 84) between the microlens 81A and the transparent substrate 82 is a vacuum layer.

The difference in refractive index between the low-refractive index layer 84 and the microlens 81A is preferably equal to or higher than 0.4 in the wavelength band of the light entering the microlens 81A. In the present embodiment, since the green light, the blue light, the red light, and the yellow light enter the microlens 81A, the difference is preferably equal to or higher than 0.4 in the visible wavelength band (the entire wavelength band not shorter than 380 nm and not greater than 750 nm). Thus, it becomes possible to use the spherical lens as the microlens 81A.

It should be noted that as the gas forming the gas layer, various gases such as air, nitrogen, or argon can be used, and air is preferable from an economic point of view. The vacuum forming the vacuum layer is only required to be a reduced-pressure state lower than the atmospheric pressure (1 atm), and is not necessarily required to be the perfect vacuum with zero pressure.

By disposing the low-refractive index layer 84 with a large difference in refractive index from the microlens 81A on the lens surface 81As side of the microlens 81A as in the present embodiment, it becomes possible to use the spherical lens as the microlens 81A. For example, in the case of using the gas layer or the vacuum layer as the low-refractive index layer 84, since the refractive index of the low-refractive index layer 84 is approximately 1, the difference in refractive index between the microlens 81A and the low-refractive index layer 84 becomes the maximum. In this case, it is possible to significantly refract the light having entered the microlens 81A to thereby make it enter the targeted sub-pixels. Therefore, it becomes possible to use not only the aspherical lens with high refractive power but also the spherical lens with relatively low refractive power as the microlens 81A. The spherical lens is easy to manufacture compared to the aspherical lens, and can therefore be manufactured at lower cost, and at the same time, aberration can easily be reduced since roughly the same lens shape as designed can be obtained. Therefore, it becomes possible to make the light having entered the microlens 81A enter the targeted sub-pixels with accuracy.

Fifth Embodiment

Figure 12:
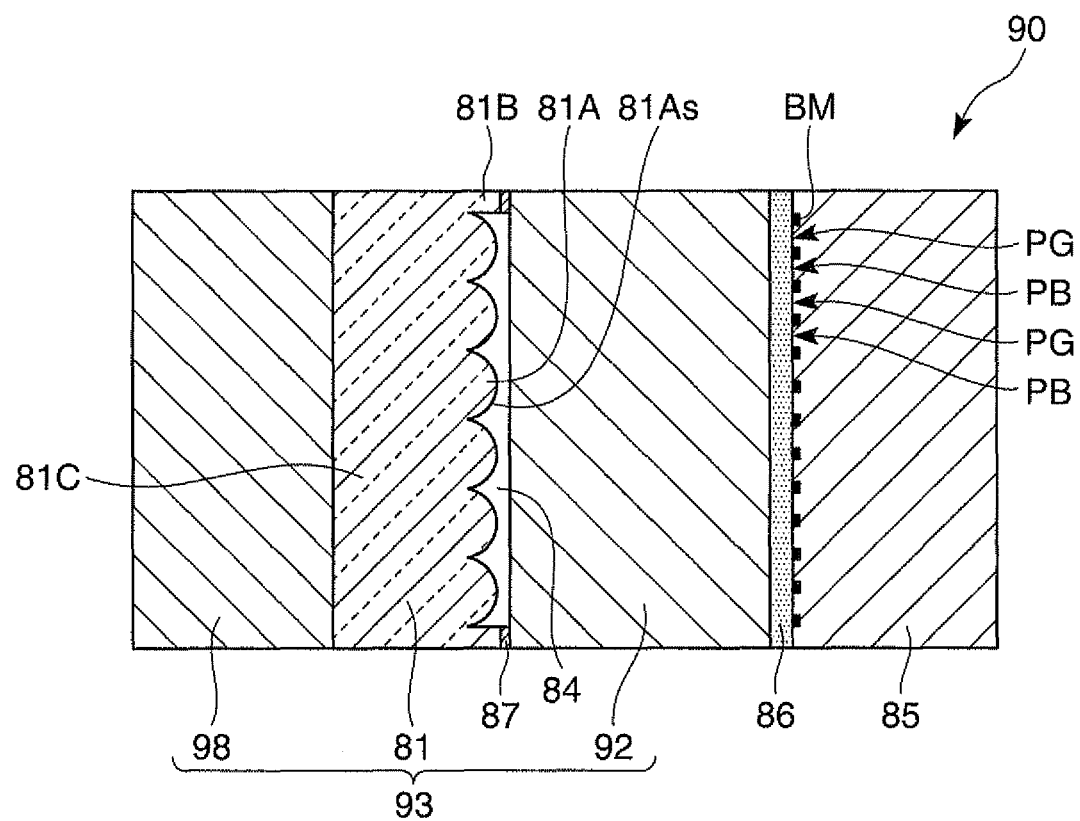
FIG. 12 is a cross-sectional view of a light modulation element of a fifth embodiment.

In the fifth embodiment, a light modulation element 90 is used instead of the light modulation element 80 in the fourth embodiment. FIG. 12 is a schematic diagram showing an X-Y cross-sectional surface of the light modulation element 90 of the present embodiment. In the present embodiment, the constituents common to the present embodiment and the fourth embodiment are denoted by the same reference symbols, and the detailed explanation therefor will be omitted.

The light modulation element 90 is provided with the first substrate 85, a second substrate 93 provided with the microlens array 81, and the liquid crystal layer 86 sandwiched between the first substrate 85 and the second substrate 93. Similarly to the fourth embodiment, the microlens 81A is formed of an spherical lens.

The second substrate 93 is provided with the microlens array 81, a first transparent substrate 92, and a second transparent substrate 98. To the light exit side of the microlens array 81, there is bonded the thin first transparent substrate 92 with the thickness in a range of 40 μm through 50 μm. Further, to the light entrance side of the microlens array 81, there is bonded the thick second transparent substrate 98 with the thickness in a range of 1.0 mm through 1.4 mm. Since the microlens array 81 and the first transparent substrate 92 are bonded to the thick second transparent substrate 98, the rigidity of the microlens array 81 and the first transparent substrate 92 are reinforced.

Similarly to the fourth embodiment, also in the present embodiment, the low-refractive index layer 84 having a refractive index lower than that of the microlens 81A is disposed on the lens surface 81As side of the microlens 81A. In the case of the present embodiment, the low-refractive index layer 94 is an air layer.

In the present embodiment, although the orientation of the lens surface 81As of the microlens array 81 is different from that of the microlens array 81 of the fourth embodiment, the action and the effect exerted by the microlens 81A and the low-refractive index layer 84 are substantially the same as in the fourth embodiment. Therefore, the projector with which the resolution of the image is difficult to be degraded can be provided also in the present embodiment.

Although the preferred embodiments of the invention are hereinabove explained based on the first through the fifth embodiments, the invention is not limited to the embodiments described above. It is also possible to use the second substrate 83 used in the fourth embodiment in the projector according to the second embodiment or the projector according to the third embodiment. Further, it is also possible to use the second substrate 93 used in the fifth embodiment in the projector according to the second embodiment or the projector according to the third embodiment.

Further, although in the fourth embodiment and the fifth embodiment, the microlens array having the spherical surface and the low-refractive index layer are combined, it is also possible to combine the microlens array having the aspherical surface and the low-refractive index layer.

Further, in the fourth embodiment, since the vacuum layer is used as the low-refractive index layer 84, the microlens array 81 is bonded to the transparent substrate 82. However, in the case of using the air layer as the low-refractive index layer 84, the transparent substrate 82 can be eliminated.

Further, although in the fourth embodiment and the fifth embodiment, the lens surface of the microlens has contact with the low-refractive index layer, it is also possible to provide a antireflective film to the lens surface of the microlens.

Further, although in the first embodiment, the reflecting surfaces 33a, 34a, 35a, and 36a are disposed so that the plane including the light axis of the third light and the light axis of the fourth light is perpendicular to the plane including the light axis of the third light and the light axis of the fifth light, the arrangement is not limited thereto. It is sufficient to separate the light w emitted from the light source 10 in two directions so that the straight line L1 and the straight line L2 corresponding to each of the pixels PX are parallel to each other or intersect with each other as shown in FIG. 3C. Regarding this point, the same can be applied to the second through fifth embodiments.

The entire disclosure of Japanese Patent Application No.: 2011-164313, filed on Jul. 27, 2011 and 2012-031850, filed on Feb. 16, 2012 are expressly incorporated by reference herein.

What is claimed is:

1. A projector comprising:
   a light source;
   a first light separation optical system adapted to separate light emitted from the light source into a first light and a second light;
   a second light separation optical system adapted to separate the first light into a third light of a first color and a fourth light of a second color, separate the second light into a fifth light of a third color and a sixth light of a fourth color, and emit the third light, the fourth light, the fifth light, and the six light in directions intersecting with a plane including a light axis of the light emitted from the light source and a light axis of the first light; and
   a light modulation element which the third light, the fourth light, the fifth light, and the sixth light enter, wherein
   the first light separation optical system includes
      a first reflecting element adapted to reflect the first light and transmit the second light, and
      a second reflecting element adapted to reflect the second light, and
   the second light separation optical system includes
      a third reflecting element adapted to reflect the third light and the fifth light and transmit the fourth light and the sixth light, and
      a fourth reflecting element adapted to reflect the fourth light and the sixth light.

2. The projector according to claim 1, wherein
   a reflecting surface of the first reflecting element is tilted with respect to a reflecting surface of the second reflecting element, and
   a reflecting surface of the third reflecting element is tilted with respect to a reflecting surface of the fourth reflecting element.

3. The projector according to claim 2, wherein
   defining an imaginary axis forming an angle of 45° with the light axis of the light entering the first light separation optical system as a first axis, and an imaginary axis forming an angle of 45° with an imaginary axis perpendicular to both of the light axis of the light entering the first light separation optical system and the first axis as a second axis,
   an angle formed between the reflecting surface of the first reflecting element and the first axis and an angle formed between the reflecting surface of the second reflecting element and the first axis are equal to each other, and
   an angle formed between the reflecting surface of the third reflecting element and the second axis and an angle formed between the reflecting surface of the fourth reflecting element and the second axis are equal to each other.

4. The projector according to claim 1, wherein
a pixel provided to the light modulation element includes
   a first sub-pixel corresponding to the third light,
   a second sub-pixel corresponding to the fourth light,
   a third sub-pixel corresponding to the fifth light, and
   a fourth sub-pixel corresponding to the sixth light,
a microlens is disposed on a light entrance side of the light modulation element so as to correspond to the pixel, and
the microlens collects
   a part of the third light toward the first sub-pixel,
   a part of the fourth light toward the second sub-pixel,
   a part of the fifth light toward the third sub-pixel, and
   a part of the sixth light toward the fourth sub-pixel.

5. The projector according to claim 4, wherein
a shape of the first sub-pixel is a shape necessary and sufficient for being capable of including the light collected by the microlens toward the first sub-pixel,
a shape of the second sub-pixel is a shape necessary and sufficient for being capable of including the light collected by the microlens toward the second sub-pixel,
a shape of the third sub-pixel is a shape necessary and sufficient for being capable of including the light collected by the microlens toward the third sub-pixel, and
a shape of the fourth sub-pixel is a shape necessary and sufficient for being capable of including the light collected by the microlens toward the fourth sub-pixel.

6. The projector according to claim 4, wherein
the shapes of the first sub-pixel, the second sub-pixel, the third sub-pixel, and the fourth sub-pixel are each a roughly square shape.

7. The projector according to claim 4, wherein
the microlens is an aspherical lens.

8. The projector according to claim 4, further comprising:
a low-refractive index layer, which has a refractive index at least 0.4 lower than a refractive index of the microlens in a visible wavelength band, disposed on an lens surface side of the microlens.

9. The projector according to claim 8, wherein
the low-refractive index layer is one of a gas layer and a vacuum layer.

10. The projector according to claim 8, wherein
the microlens is a spherical lens.

11. The projector according to claim 1, wherein
each of the third light, the fourth light, the fifth light, and the sixth light is colored light selected from a group consisting of blue light, green light, yellow light and red light.

12. The projector according to claim 11, wherein
the third light is one of the green light and the yellow light.

* * * * *